United States Patent [19]
Hamel

[11] 3,827,281
[45] Aug. 6, 1974

[54] SHEET MATERIAL AND KNIFE EDGE ABRASIVE TEST

[75] Inventor: Richard Hamel, Dorion, Quebec, Canada

[73] Assignee: Domtar Limited, Montreal, Canada

[22] Filed: July 31, 1972

[21] Appl. No.: 276,771

[30] Foreign Application Priority Data
Aug. 3, 1971 Canada .............................. 119,714

[52] U.S. Cl. ........................................ 73/7, 356/69
[51] Int. Cl. ............................................. G01n 3/58
[58] Field of Search ................. 73/7, 9, 104; 356/69

[56] References Cited
UNITED STATES PATENTS

| | | | |
|---|---|---|---|
| 1,780,822 | 11/1930 | Honda | 73/7 |
| 2,469,385 | 5/1949 | Hallock | 73/104 |
| 2,625,224 | 1/1953 | Garrett | 73/7 |

Primary Examiner—Richard C. Queisser
Assistant Examiner—Daniel M. Yasich
Attorney, Agent, or Firm—Cecil A. Rowley

[57] ABSTRACT

A method and apparatus for testing the abrasiveness of materials such as paper, textiles, or the like, by pressing a sharp but relatively easily dulled cutting edge through a plurality of layers of paper and registering the force necessary to move the knife edge through the layers relative to the depth of cut thereby to obtain an indication of the rate of dulling of the knife and thus the abrasion characteristics of the paper.

5 Claims, 6 Drawing Figures

SHEET MATERIAL AND KNIFE EDGE ABRASIVE TEST

FIELD OF THE INVENTION

The present invention relates to an abrasiveness test for paper. More specifically, the present invention relates to a method of evaluating the abrasive characteristics of a sample and thereby predicting the knife-life of a cutting blade.

DESCRIPTION OF THE PRIOR ART

Several different abrasion tests have been proposed and are currently in use for testing paper. For example, there is a mechanical "wet thumb" test which rubs the surface of the paper giving a numerical evaluation of the wet abrasion resistance of papers. This test is particularly important in relation to papers such as blueprint, map papers, or any paper that is handled and used while wet. Another form of apparatus, the Taber Abraser, is used for testing both wet and dry paper. This apparatus uses a horizontal motor-driven turntable to which the specimen is attached and a special abrasive embedded wheel which rotates on the specimen. The abraded material is removed by suction and is weighed thereby providing an indication of the abrasing characteristics of the paper in accordance with the amount of material lost — generally designated as the "abrasive loss." Yet another abrasion test simply draws an eraser over the surface of the paper and measures the number of passes necessary to wear a hole. This is particularly important for writing papers that must tolerate erasures without impairing the surface characteristics.

An abrasion test has been devised to predict the wear imparted to printing surfaces by heavily loaded papers or papers which liberate mineral dust in use. This test, the Bekk Test, measures abrasion by drawing a strip of paper through a distance of 10 cm. between a glass plate and a rotating roller which holds the paper in contact with the glass under a pressure of 1 kg/sq. cm. of width of the strip. Very fine scratches produced on the glass slide are counted and measured under a microscope, and the results obtained used to predict the wear characteristics of the paper on printing plates.

It will be apparent that none of the above tests would provide an indication of the relative abrasive influence of the paper on a cutting edge and thus could not be used to predict the relative effect of the paper on the knife-life of a knife used commerically to cut the material, for example, how the paper might effect the knife-life in a bindery. The above tests also do not provide a quality control test that could be used by the paper manufacturer to better control the relative abrasion characteristics of paper produced.

It is thus the main object of the present invention to provide a test wherein the abrasion characteristics of paper on a knife may be used to predict the knife-life obtainable when cutting such papers in a converting plant or bindery.

SUMMARY OF THE INVENTION

Broadly, the present invention relates to a method and apparatus for testing paper comprising forming a book of a plurality of layers of paper, positioning said book relative to a cutting edge that is sharp and more rapidly dulled than the cutter used commercially to cut such paper, moving said cutting edge through said book to force said knife to cut successively through a plurality of said layers of paper at a substantially constant speed registering or recording the change in force necessary to maintain said constant speed as said edge penetrates through said layers of paper thereby to obtain an indication of the rate of dulling of said edge indicating the abrasion characteristics of said paper.

BRIEF DESCRIPTION OF THE DRAWING

Further features, objects and advantages will be evident from the following detailed description of a preferred embodiment of the present invention taken in conjunction with the accompanying drawings in which.

DESCRIPTION OF THE PREFERRED EMBODIMENTS

Basically, one form of the apparatus for carrying out the present invention comprises a cross-head 12 mounted for relative movement toward and away from the supporting table 14. The rate of advance of the head 12 can be maintained substantially constant by means of a machine schematically indicated at 15 and the load exerted is recorded on the recorder 16. Recorder 16 plots the instantaneous force on the table 14 against the position of the cross-head 12. Such devices are well-known and are currently available on the market, for example the well-known INSTRON machine.

Mounted on the cross-head 12 is a suitable cutting head 18. This edge must be relatively sharp and should be of such characteristics that it will be worn or dulled appreciably in cutting through a convenient depth, say 6 inches for paper. In the tests currently conducted, injector razor blades have been found satisfactory, however, it is preferred to use a more accurate blade having only a single wedging surface facing toward the free end of the book of paper to be cut.

Figure 1:
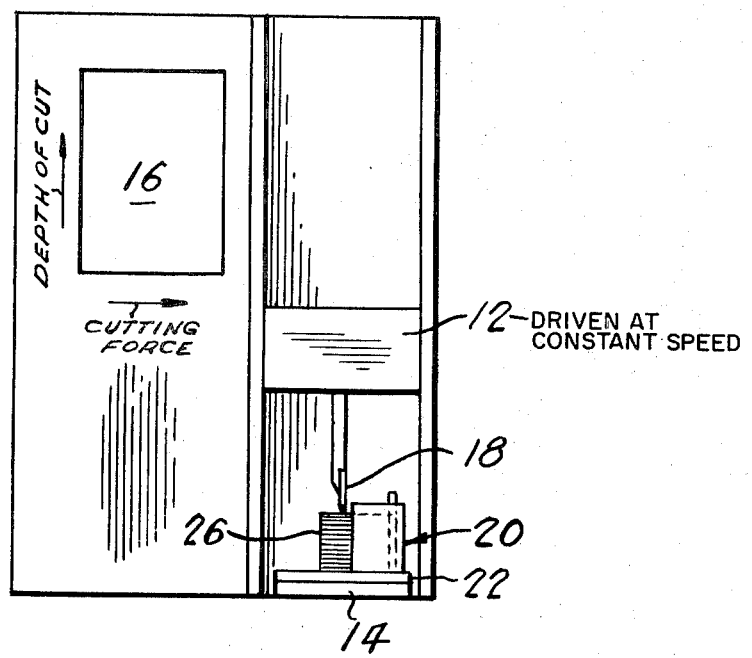
FIG. 1 is a schematic side elevation view of one form of apparatus suitable for carrying out the present invention.
Figure 2:
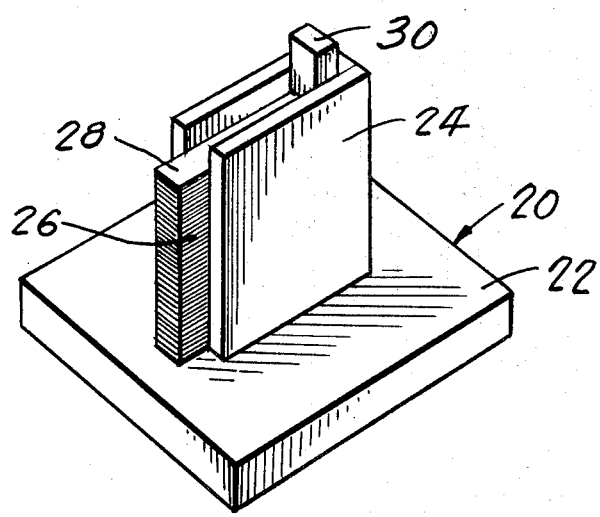
FIG. 2 is an isometric view of one form of book holder illustrating a book in position therein.

Positioned on the table 14 is a holder 20 which is illustrated in more detail in FIG. 2. This holder 20 comprises a base 22 and a three-sided housing 24. A sample 26, such as a book of sheet material, say paper, formed of a plurality of layers or leaves laid one on top of the other, is received between the side walls of the housing 24 and is positioned so that a portion adjacent a free edge thereof, as indicated at 28, projects from the housing 24. Suitable positioning of the book 26 may be obtained by means of blocks 30 inserted behind the book 26.

To test the abrasiveness of a paper sample, a book 26 of the paper is made up and is positioned in the holder 20. A suitable razor blade or the like is placed in the cross-head 12 and the blade 18 is brought into contact with the upper sheet in the exposed section 28 of the book 26; the edge 18 is then forced at a constant rate to cut through the book 26 and the force is plotted relative to the position of the cross-head 12 and knife 18, i.e., the depth of cut.

The size of book used, namely the lateral width of the book (the spacing between the side walls of the housing 24) should be constant for all tests if correlation between the test results is to be obtained, and should be less than the length of the cutting blade 18 so that movement of the cutting blade 18 severs a portion of the projecting section 28 of each layer from the book 26.

The sample books may be made to test paper in either the cross-machine (C.D.) or in the machine direction (M.D.). For proper comparison, of course, M.D. samples will be compared with other M.D. samples and C.D. samples with other C.D. samples.

Figure 3:
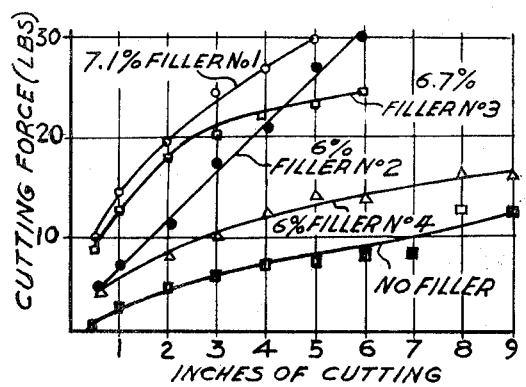
FIG. 3 is a graph illustrating the effect of different fillers on abrasiveness of the paper.
Figure 4:
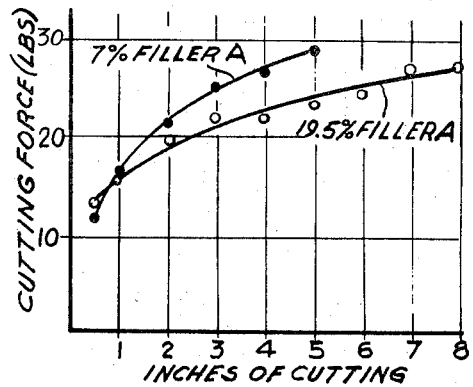
FIG. 4 is a graph illustrating the effect of filler content on abrasiveness.

The graphs of FIGS. 3 and 4 are made from data obtained by processing sample books 15 mm. wide and formed from hand sheet papers. The filler content specified is the actual amount of filler retained in each sheet. During the test, stainless steel injector razor blades sold under the Trade Mark SCHICK were used and advanced by the cross-head at a speed of 0.5 inch per minute to cut the sample.

It has been found that with the injector razor blades, cutting the paper samples at a cutting rate of 0.5 inch per minute, the maximum pressure should not exceed 35 lbs., as above this pressure the readings become erratic due to knife failure. These particular parameters are, of course, dependent on the specific cutter blades being used and the material being cut.

Typical graphs of cutting force in pounds versus cutting depth in inches for various filled papers are shown in FIG. 3.

The paper containing 7.1 percent of filler No. 1 requires the highest force to cut the sample and thus it would be expected that this particular paper would result in a relatively short knife-life.

The paper containing 6 percent of filler No. 2 requires slightly less force for a given depth of cutting and would be expected to result in a knife-life slightly longer than that for filler No. 1.

The paper filled with filler No. 3, in the initial stages of cutting, shows a cutting force higher than that required during the initial stages for filler No. 2. However, it will be noted that the curve flattens out, indicating that the rate of dulling of the knife is reduced and transverses the curve for filler No. 2. Based on the curves for fillers No. 2 and No. 3, it would be expected that the paper with filler No. 3 would permit a longer knife-life than a paper with filler No. 2. However, this would not have been apparent had the test been terminated after say 3 inches of cutting. It is thus important that a relatively long cut be produced to ensure that an accurate determination of knife-life is obtained.

The paper containing 6 percent of filler No. 4 would be expected to have a minimum amount of wear on the knife thereby ensuring a relatively long knife-life.

It is interesting that in the test with paper containing no filler an exceptionally long knife-life is indicated as would be expected, as the filler used is a major factor determining the knife-life.

The graphs of FIG. 4 clearly indicate that the amount of filler used has a significant effect on the cutting force necessary and thus on the expected knife-life. Surprisingly, paper containing the lesser amount of filler was the more abrasive and would be expected to result in a shorter knife-life. The most plausible explanation is that, in lower amounts, each filler particle is trapped between the fibres; consequently when the knife is pressed down on the paper a scuffing action takes place between the knife and the filler particles. The greater this action, of course, the faster the knife will dull. At high concentrations, on the other hand, these will be a weakening of fibre bonding. Presumably then, when the knife is forced through the fibres it will tend to push aside filler particles, decreasing the scuffing action, and then reducing the abrasive effect.

In an attempt to correlate the test results with actual results obtained in the field, three separate papers were tested in the field and tested using the present invention. The curves of the test conducted in accordance with the present invention are given in FIG. 5. It will be apparent that the curve for Paper A indicated the shortest knife-life while the curve for Paper C indicated longest knife-life. In practice, the papers fell into the same relative positions as predicted by the curves of FIG. 5.

Figure 5:
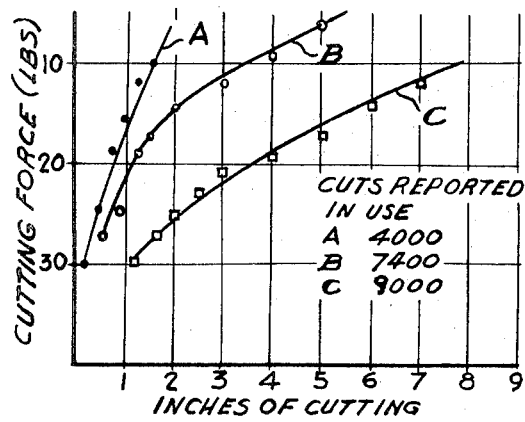
FIG. 5 is a graph which may be used predicting the trimmer knife-life based on abrasion characteristics of the paper.

While it may not be always feasible to obtain the type of prediction indicated by FIG. 5, it is believed that the relative knife-life will always be predicted provided the test is carried to a sufficient pressure or alternatively through a sufficient depth of cut, i.e. through a sufficient number of sheets. It is believed that any material change in the slope of the curve indicating a significant change in the rate of dulling as did the paper with filler No. 3 in FIG. 3, would be apparent after a depth of cut of at least, say 6 inches for paper. Alternatively, the test should be carried out until a certain cutting force is necessary. With the blades tested, 35 lbs. was found to be adequate in that when this force was required, a good clear indication of the relative abrasiveness of the papers tested was available without the results becoming erratic due to knife damage. The depth of cut or maximum force required to obtain the desired information would vary depending on the type of knife used in the test (including shape and hardness) and the speed of the cutter-head.

If a prediction of knife-life in practice is to be made from the test results, the correlation between bindery conditions and test conditions would have first to be made.

Figure 6:
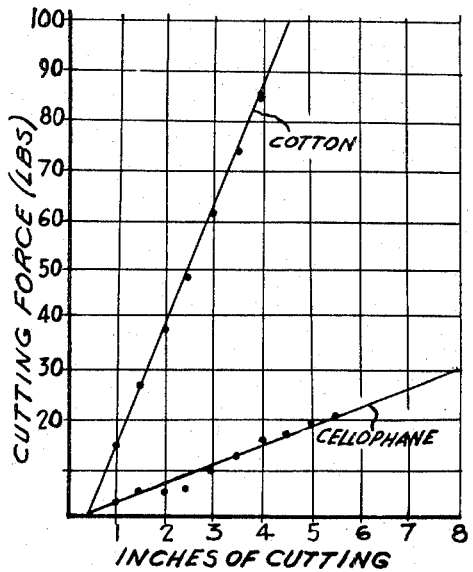
FIG. 6 is a graph illustrating results obtainable using example materials other than paper.

Referring to FIG. 6, it can be seen that not only paper may be tested using the present invention, but also tests can be applied to such materials as cellophane, cotton, or other similar sheet material. With cotton it was possible to reach a pressure of 100 lbs. and still obtain meaningful results using the same injector razor blades and speed as was used on the tests for paper and wherein the maximum pressure was about 35 lbs. It would be expected that other materials would display similar characteristics and that as the filler content is varied the rate of dulling or abrasion of the cutting edge would change. Thus, it is contemplated that the instant invention be applied to materials other than paper, cotton, or cellophane as disclosed.

Modifications will be evident to those skilled in the art without departing from the spirit of the invention as defined in the appended claims.

I claim:

1. A method of testing the abrasion characteristics of sheet material comprising forming a book of a plurality of layers of said sheet material, positioning said book relative to a cutting edge that is more easily dulled than cutting edges normally used commercially to cut said material, applying forces to move said cutting edge through a plurality of said layers at a substantially constant speed, recording the change in said forces required to maintain said constant speed after a selected period of time as said edge penetrates through said layers thereby to obtain an indication of the rate of dulling of said edge and an indication of the abrasion characteristics of the material.

2. A method as defined in claim 1 wherein said cutting edge is moved in a direction substantially perpendicular to said book whereby said edge cuts successively through said plurality of layers.

3. A method as defined in claim 2 wherein said material is paper.

4. A method as defined in claim 2, wherein said cutting edge is moved in said direction for a distance of at least 3 inches.

5. A method as defined in claim 2, wherein said edge severs completely across said book thereby to separate a portion of each layer from said book as each layer is severed by said edge.

* * * * *